(12) United States Patent
Schmidt et al.

(10) Patent No.: US 7,210,131 B2
(45) Date of Patent: Apr. 24, 2007

(54) METHOD AND SYSTEM FOR MIGRATING COMPUTER STATE

(75) Inventors: Jim Schmidt, Seattle, WA (US); Calin Negreanu, Ridgefield, CT (US)

(73) Assignee: Microsoft Corporation, Redmond, WA (US)

(*) Notice: Subject to any disclaimer, the term of this patent is extended or adjusted under 35 U.S.C. 154(b) by 394 days.

(21) Appl. No.: 09/968,623

(22) Filed: Oct. 1, 2001

(65) Prior Publication Data

US 2003/0074386 A1   Apr. 17, 2003

(51) Int. Cl.
*G06F 9/45* (2006.01)
(52) U.S. Cl. ...................................... 717/137
(58) Field of Classification Search .............. 713/1, 713/2, 100; 717/168–178; 707/203
See application file for complete search history.

(56) References Cited

U.S. PATENT DOCUMENTS

| | | | |
|---|---|---|---|
| 6,075,943 A | | 6/2000 | Feinman |
| 6,161,176 A * | | 12/2000 | Hunter et al. ................ 713/1 |
| 6,182,212 B1 * | | 1/2001 | Atkins et al. ................ 713/1 |
| 6,301,710 B1 * | | 10/2001 | Fujiwara ................ 717/175 |
| 6,442,754 B1 * | | 8/2002 | Curtis ................ 717/175 |
| 6,463,584 B1 * | | 10/2002 | Gard et al. ................ 717/171 |
| 6,484,309 B2 * | | 11/2002 | Nowlin et al. ............... 717/100 |
| 6,698,017 B1 * | | 2/2004 | Adamovits et al. ......... 717/168 |
| 2002/0073410 A1 * | | 6/2002 | Lundback et al. .......... 717/171 |
| 2002/0104080 A1 * | | 8/2002 | Woodard et al. ............ 717/176 |
| 2002/0174329 A1 * | | 11/2002 | Bowler et al. ................ 713/1 |

OTHER PUBLICATIONS

P. Thurrott, Windows XP Installation and Upgrade Overview, Sep. 13, 2001, Paul Thurrott's SuperSite for Windows, pp. 1-6.*

* cited by examiner

*Primary Examiner*—Tuan Dam
*Assistant Examiner*—Andre R Fowlkes

(57) ABSTRACT

A system and method for migrating state data from a source computing platform to a destination platform, such as for migrating state data from one computer to another computer. Pluggable modules collect state on a source platform and transport it to temporary storage as state objects that are independent of any particular destination platform. For example, a state object may contain the information that represents a file on a source machine, while another state object may contain a piece of registry data on that machine. At the source platform, modules provide state data gathering and analysis that collect the data into the state objects. A transport module transports the data to storage accessible to the destination. At the destination, the state objects are applied by pluggable modules to the destination platform. The object data can be adjusted, translated and/or merged with destination state data as appropriate for the destination platform.

54 Claims, 7 Drawing Sheets

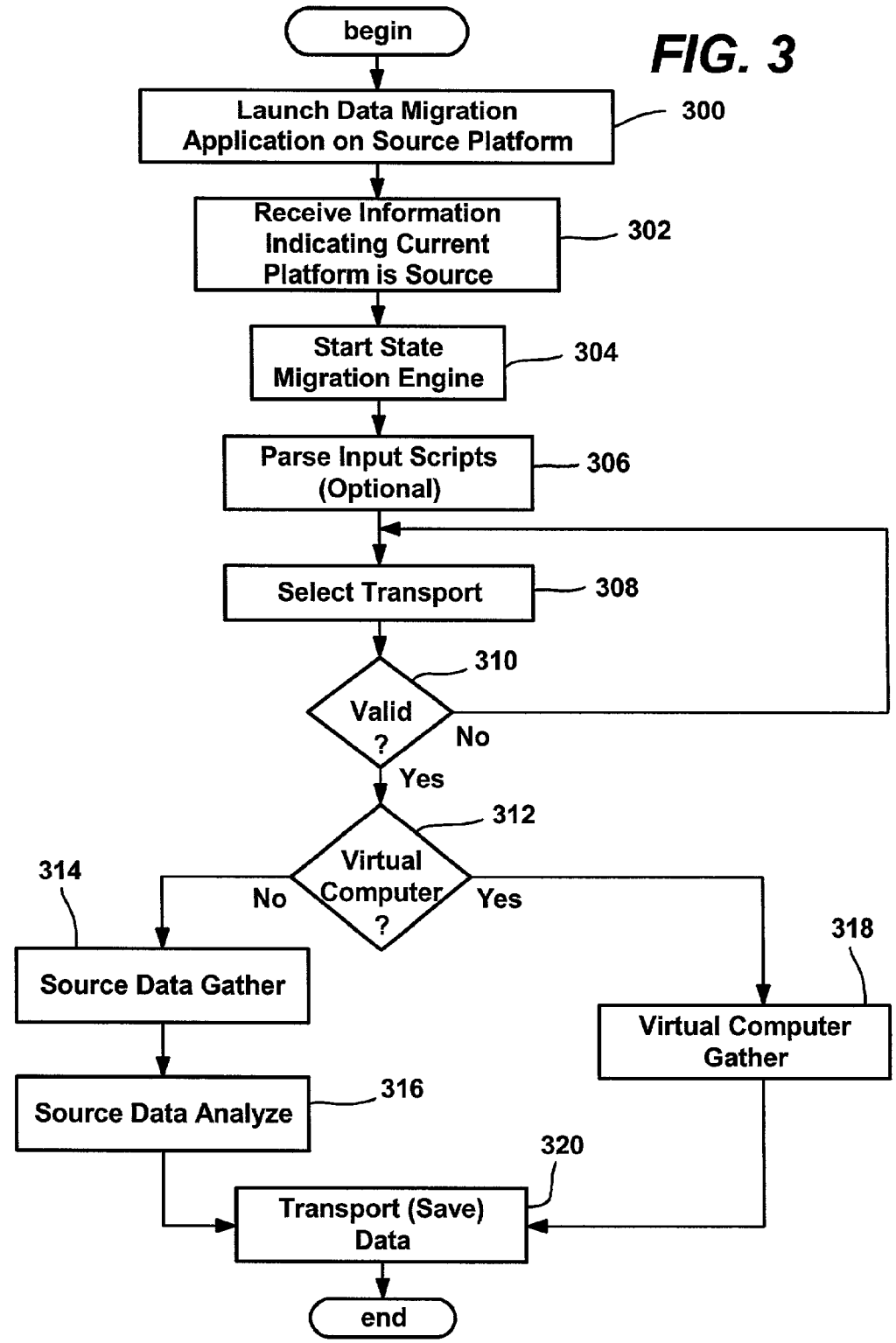

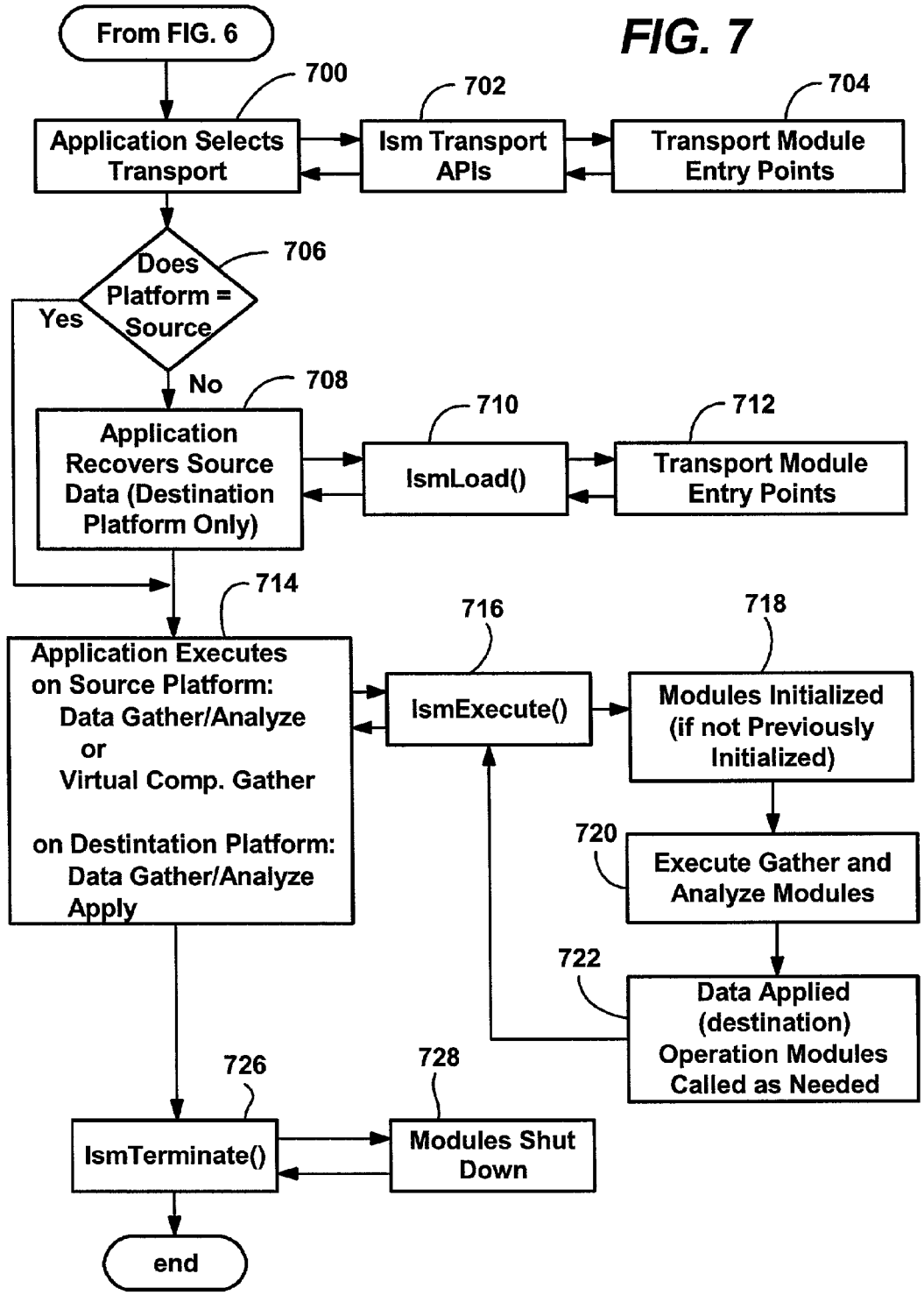

METHOD AND SYSTEM FOR MIGRATING COMPUTER STATE

FIELD OF THE INVENTION

The present invention relates generally to computers, and more particularly to the documents and settings on computers.

BACKGROUND OF THE INVENTION

Computer system hardware and software is often updated, such as when users purchase a new computer system and/or a new operating system. One of the difficulties when making such a change is getting a user's documents and settings from the previous computing environment to the new computing environment, whether it is from one machine to another, or from one operating system to another on the same machine.

In general, a user's documents and settings, such as address books, folder options, dial-up networking connection settings, and the user's data, including spreadsheet and word processing documents, may be referred to as user state, state data, or simply state. Other examples of user state include display settings (wallpapers, colors, fonts), browser component settings, accessibility settings, mapped drives, network printers, and e-mail program connectivity settings. Some of this state, often specialized for a specific application, has become extremely complex.

To migrate such user state from one environment to another, users have had to manually copy documents and manually recreate the desired settings on the new environment. Enterprises that deal with a lot of such migrations are able to automate some of this process, but are required to write complex scripts in order to do so. Both of these processes are time consuming and labor intensive. For example, individual application preferences and device settings, such as those maintained in the registry, are relatively sophisticated and therefore difficult to locate and migrate. Further, not every setting in one computing environment may be valid in the other.

Certain types of narrowly-focused migration tools have been developed, however most have only very specific capabilities. For example, operating system upgrades work to upgrade one operating system version to another, but do not address other data migration scenarios. Other tools exist for configuring a machine from a network in a managed corporate environment, but are specialized tools that are not flexible migration tools.

SUMMARY OF THE INVENTION

The present invention comprises a highly-flexible migration system, method and data structures that enable programs to collect state on a source platform and transport it to temporary storage, independent of any particular destination platform. At the source and destination platforms, an application and state migration engine are included, the state migration engine having interfaces that allow pluggable modules to handle various state migration operations. In this manner, the modules that handle state data on source platforms may be developed separately from the modules that handle state data on destination platforms.

At the source platform, the pluggable modules enable state data gathering and analysis. As part of the source state collection, the state data may be discovered, estimated, examined, organized, and analyzed such as to identify relationships and dependencies in the state data. The modules that gather and analyze the data may include scripts that can be edited at runtime. At least two types of gathering are possible: a standard gather operation that gathers, arranges and analyzes the source platform state data; and a virtual computer gather that gathers the state data in a manner that allows the state data to be edited. Because such editing can change the state data, virtual computer gathered data is arranged and analyzed by modules at the destination platform before it is applied.

The state data of the source platform is abstracted into state objects that are structured with a platform-independent format, each state object corresponding to a piece of state such as, for example, a file or registry setting. File-type state objects, registry-type state objects, and engine state objects are provided, along with extensible type state objects that can be later defined to extend the types of state data that can be migrated. The objects have associated characteristics including attributes, properties and operations that enable objects to be grouped, enumerated, distinguished from others, and so forth. Once the data is gathered into the objects, a suitable transport is selectable to transport the data to a temporary storage, such as a floppy disk, network drive or other medium accessible to the destination platform.

At the destination platform(s), the state objects are accessed, after which they may be applied to the destination. Before, or as part of, applying the state data, each object's data can be adjusted, translated and/or merged as appropriate for the destination platform. To this end, combine state modules (e.g., containing scripts developed for the destination platform) are provided for merging source platform state data with destination platform state data, while operation modules are provided for translating and applying the state data. For merging with the source platform state data, the destination includes modules that gather and analyze the destination platform state data.

Other features and advantages of the present invention will become apparent from the following detailed description when taken in conjunction with the drawings.

BRIEF DESCRIPTION OF THE DRAWINGS

FIG. 3 is a flow diagram generally representing actions taken on a source platform to gather data from the source platform accordance with one aspect of the present invention;

FIGS. 6 and 7 comprise a flow diagram generally representing operation of an application and various components to accomplish state migration in accordance with one aspect of the present invention.

DETAILED DESCRIPTION

Exemplary Operating Environment

Figure 1:
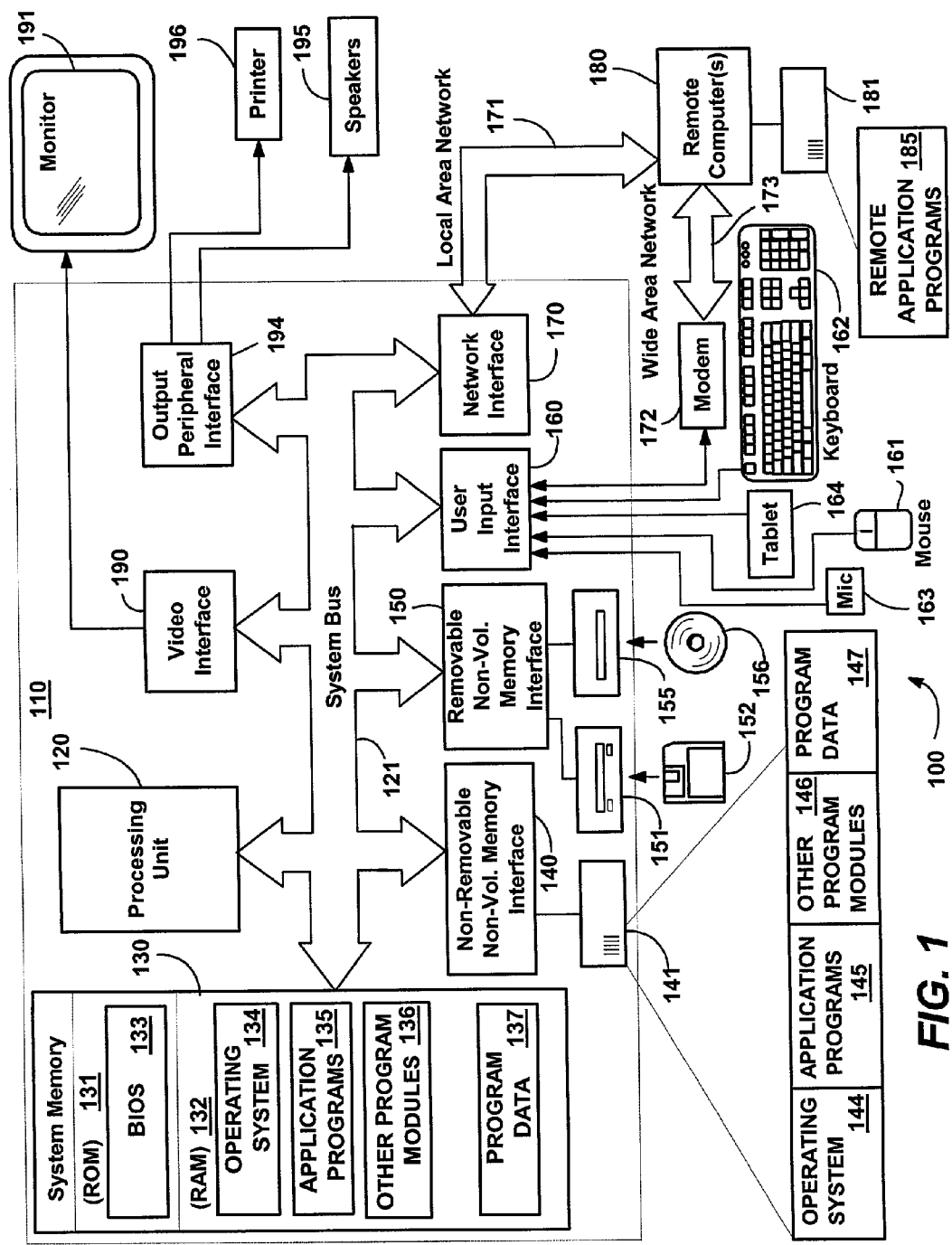
FIG. 1 is a block diagram representing an exemplary computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, that perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

State Migration—Source

The present invention is generally directed to state migration, wherein the state, e.g. user settings, files and other data, of a computer system in one platform are migrated to another platform, whether on the same computer system or on another computer system. For example, a computing platform (environment) may be changed by changing an operating system and/or by changing hardware, such as when a user purchases a new machine. As such, the present invention should not be limited to new machines or operating system changes, but rather can be considered to migrate state from any source platform to any destination platform, regardless of any change.

In accordance with one aspect of the present invention, in order to migrate state data from a source platform to a destination platform, a number of operations occur, including data gathering, estimating, state identification, state analysis, merging and translating. In general, data gathering is directed towards discovering the locations on the source platform where the user state is stored. Estimating is directed to determining the number of state objects and their size, wherein as described below, a state object generally refers to and maintains a specific piece of state, such as a file, a registry setting, or other data. State identification is directed to examining the data and organizing it, while state analysis includes identifying relationships and dependencies in the state. At the destination platform, (described below), merging is directed to consolidating two versions of user state into one, i.e., merging the state on the source with any existing state on the destination. For example, some user settings may be machine dependent, whereby a user changing machines should receive the destination machine's settings in a merge operation, not the source machine's settings. However other settings may represent the user's personal preferences, for example, whereby those preference settings should be migrated from the source to the destination platform. Translating is directed to performing conversion on the data from one format to another, e.g., to match a destination platform.

As described below, one flow of state migration operations is to compute estimations on the source machine, ask questions (e.g., of the user) necessary for data gather, and then to gather source state. Next, the state is identified to decide which state to save, analyzed to determine relationships between state (such as one setting requiring another setting), and then the state identified for saving is saved to a temporary store. At the destination, the state is recovered, including possibly asking questions needed for applying the data, gathering the destination state, identifying the destination state, and deciding how it needs to be merged with the source state. Then, the source state is applied to the destination, performing translation or merging as needed.

In accordance with one aspect of the present invention, in general, the present invention provides these various operations via pluggable, modular components that provide numerous benefits and advantages over existing data migration techniques. More particularly, in one implementation generally represented in FIG. 2, a state migration engine 200 (also referred to as an intermediate state manager, or ISM) is provided, along with an application layer program 202, one or more pluggable transports 204, and pluggable migration modules 206 and 208–215. Because of the modularity, reliable migration is achieved in a manner that allows distributed development among various groups or products, abstraction to solve virtually any migration problem, and other benefits and advantages, as will be understood from below.

Figure 2:
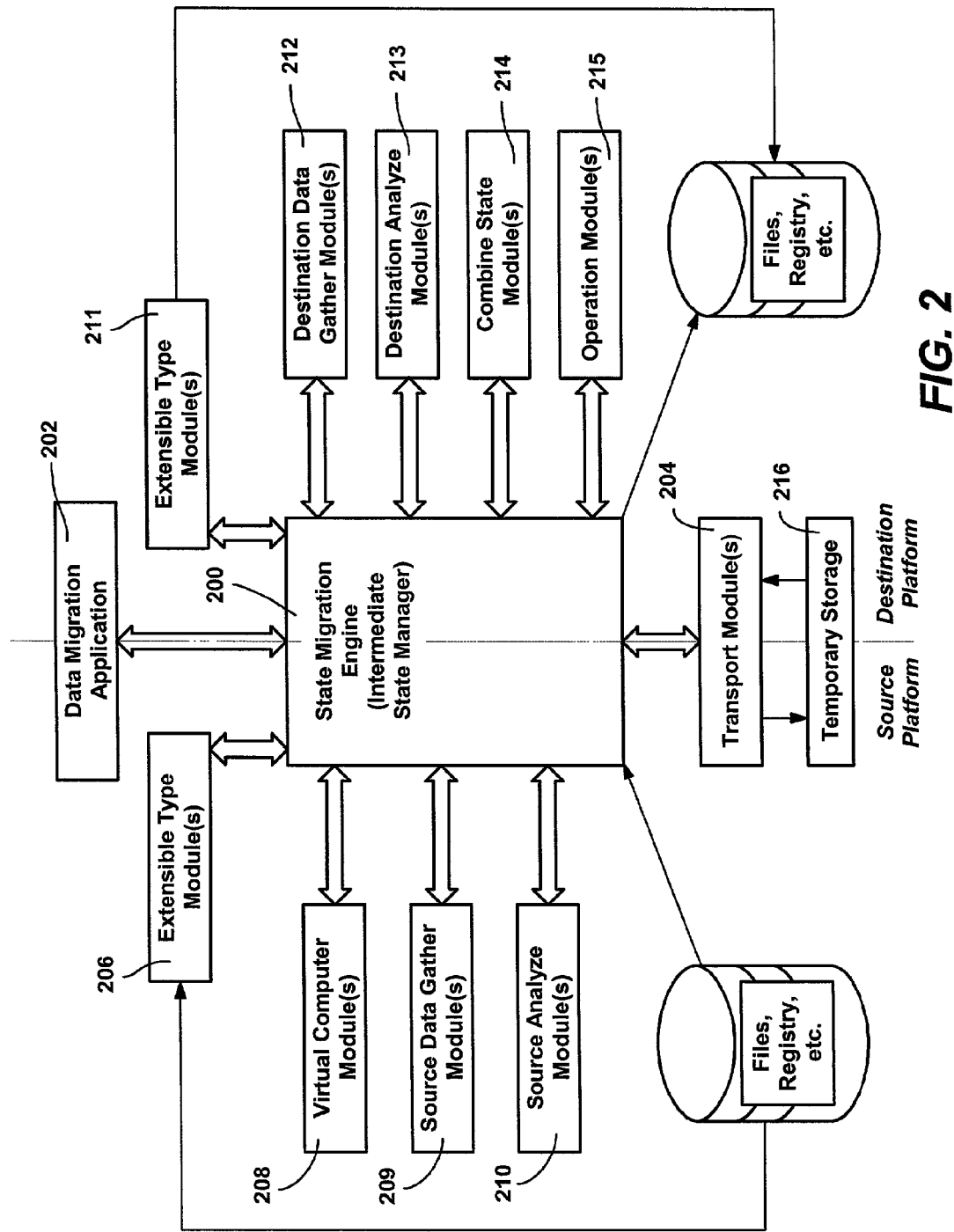
FIG. 2 is a block diagram generally representing pluggable components for implementing various aspects of state migration in accordance with the present invention.

As represented in FIG. 2, the application program 202 provides a top-level user interface that obtains information from the user, and, along with the state migration engine 200, generally controls the flow of operation. In general, migration may begin when the user launches the application program 202, which in turn will invoke the state migration engine 200. As described below, the state migration engine 200 comprises the main management engine that synchronizes other modules and coordinates state gathering and applying.

One piece of information that the application program 202 obtains (e.g., from the user) is whether the application instance is running in a source platform or a destination platform, which is not changed while the engine 200 runs. More particularly, in one implementation, an instance of the application program 202 and state migration engine 200 runs on each of the source and destination platforms, to manage the exchange from state data of the source to state data of the destination. This concept is generally represented in FIG. 2 by the dashed line between the source and destination platforms. For example, when migrating data from one machine to another, an application instance and migration engine instance may be run on a source machine to gather state from the source, while another instance of the application and migration engine may be run on a destination machine to apply the state to the destination. Thus, even though only one block is shown in FIG. 2 for the engine 200 and one block for the application 202, it is understood that multiple instances of these components may be run, one on each platform. Alternatively, note that instead of having instances of the same components that behave differently as appropriate for source or destination operations, different source and destination applications 202 and/or state migration engines 200 may be run. In a described implementation, the application, migration engine and various components may have to be adapted to run on their platform, but in general each will provide the same functionality regardless of the platform. Note however, that the transported data is generic to platforms, e.g., when later read at the destination, the data will appear in the same structure as when initially written at the source, and thus will be readable at the destination platform regardless of the source platform. Further, note that although the source and destination components appear to be represented herein as running at essentially the same time, as will be understood, a time gap will typically exist between source (e.g., collecting state) and destination (e.g., applying state) operations. Note that it is feasible to have a system wherein at least some of the operations on the destination platform are executed prior to completion of all operations on the source platform.

At this time, the present example will describe source platform operations, which are generally represented in the flow diagram of FIG. 3. In FIG. 3, step 300 represents the launching of the application 200, while step 302 represents receiving the information (e.g., from the user) indicating that the program is operating on a source platform.

Before starting the state migration engine 200, the application program 202 can perform any number of tasks, such as preparing a fresh operating system, or initializing a graphical interface. When initialization is ready, the application starts the state migration engine 200, e.g., in one implementation by loading an engine dynamic link library (DLL) and calling the DLL's initialization entry points. This is generally represented in FIG. 3 via step 304. Note that because the state migration engine 200 is a pluggable component, the application program 202 can provide virtually any type of suitable user interface, such as a graphical user interface, command line prompt, web interface and so forth.

Once the state migration engine 200 is started, the state migration engine 200 along with the application program 202 generally control the flow of migration. In one preferred implementation, the state migration engine 200 handles the component communication, e.g., the application program 202 does not communicate directly with the other modules, but instead communicates indirectly with them through interfaces (e.g., application programming interfaces (APIs) or the like) provided by the state migration engine 200. Similarly, in a described embodiment, modules can communicate with other modules, but only through the state migration engine 200. In this implementation, the application program 202 does not directly call modules and modules should not call the entry points of other modules. Various functions provided by the state migration engine 200 are set forth in APPENDIX A.

Similarly, in this described implementation, the state migration engine 200 controls access to the physical system, (e.g., the components that maintain the source data), in that modules do not read and write to the physical system. Instead, the various modules call state migration engine 200 functions to acquire data and/or alter the physical system. Note however, that one module is allowed to read and write from the physical system, an extensible type module 206, specifically designed to convert the physical system into an abstract type, (and vice-versa via a similar module 211 on the destination platform).

After the application program 202 has started the state migration engine 200, the application program 202 regains control and may continue to interact with the user and perform other operations. For example, when the application program 202 is running on a source machine, the application program 202 can have the source modules pre-parse their input scripts, allowing the user to customize the input scripts at runtime. Step 306 of FIG. 3 represents this optional source platform step.

As represented by step 308, one of the choices that the user may be given is to select a transport 204, normally through the user interface of the application program 202. In general, a transport is a module that saves and restores the state by putting source data into a temporary storage location 216, and retrieving it therefrom on the destination. Note that preferably, a transport does not understand, analyze, interpret or otherwise work with the state data, but rather simply saves binary data and restores it on demand. Various transports may be provided depending on a given configuration, from which the user may select an appropriate one. By way of example, a user may have a number of options for migrating state data, such as "Save to Floppy" or "Automatic Network Transport." A transport may work with virtually any communications medium (e.g., including wired or wireless), and/or any read-write medium, (e.g., including hard disk, floppy disk, network drive, tape, optical disk, RAM and so forth).

To select a transport, in one implementation, the application 202 calls an IsmSelectTransport function of the state migration engine 200, (note that "Ism"-named functions are those of the state migration engine 200 as generally represented in APPENDIX A). The application 202 may also enumerate the available transports by calling an IsmEnumFirstTransport function of the state migration engine 200. When selecting a transport in this implementation, the application 202 may pass in a set of required capabilities, and in response the transport module will indicate whether the capabilities are supported. For example, capabilities may include compression and/or encryption, and "Virtual computer mode" support may also be a capability.

In addition to selecting a transport, the application program 202 (e.g., via the user) may also set the temporary store location. More particularly, in the described implementation, the application program 202 specifies a storage location by calling another function, IsmSetTransportStorage, which allows the application 202 to specify the storage location path, along with required capabilities. The transport module 204 can then test the storage path, validate it, check for an existing image, and so forth, and provide the results to the application. Multiple calls to the IsmSelectTransport and IsmSetTransportStorage functions of the state migration engine 200 may be used to make sure the user's choices are valid. When the data is later transported, the state migration engine 202 calls the last selected transport, which maintains the last selected transport location. Once the transport of data begins, the transport selection and storage location do not change.

Thus, when the user selects a transport (step 308), transport information is passed to the state migration engine 200 by calling suitable entry points/APIs. In this manner, transport information such as a temporary storage path (e.g., floppy or network drive) and any required capabilities are passed to the state migration engine 200. A result provided in response to the call to the state migration engine 200 indicates to the application program 202 whether the transport choice and related information is valid, as generally represented in FIG. 3 by step 310. If not valid, the application program 202 can inform the user of the invalid choice, and wait (e.g., loop) until a transport is successfully chosen.

Once a valid transport is selected, the application program 202 executes the process of gathering data. As represented in FIG. 3 via steps 312, 314, 316 and 318, there is a choice of two flow paths, a standard flow path, (steps 314 and 316), used when the temporary storage 216 does not need to be edited, and a virtual computer flow path, (step 318), which allows gathered data that is temporarily stored to be edited.

In the standard path of steps 314 and 316, the source machine is scanned, and data is gathered, organized, and analyzed. When the results are transported to the temporary storage 216, any decisions made regarding the state data remain unchanged when the results are applied at the destination.

Alternatively, the virtual computer path of step 318 is used when the temporary storage files can be edited. In this event, the source data can potentially be changed between the gather and apply phases. Because virtually any change can be made, decisions made about the source computer are deferred until the apply phase, and thus any data analysis is also deferred. Note that the two different flow paths may require different transports, e.g., virtual computer transports may be incompatible with standard transports.

To summarize, the application 202 starts the state migration engine 200, the platform is identified as a source, a transport is chosen, and any input scripts are optionally parsed. The application 202 then calls the state migration engine 200 to execute one of the two flow paths. The state migration engine 200 takes over, enumerating the data on the system, and calling the modules (e.g., 208 or 209 and 210), using the calls described below. During data gathering, the state migration engine 200 may call back the application 202 (e.g., periodically) so that progress and/or status may be provided to the user. When gathered and analyzed as appropriate, the data is transported to the temporary storage 216.

Figure 4A:
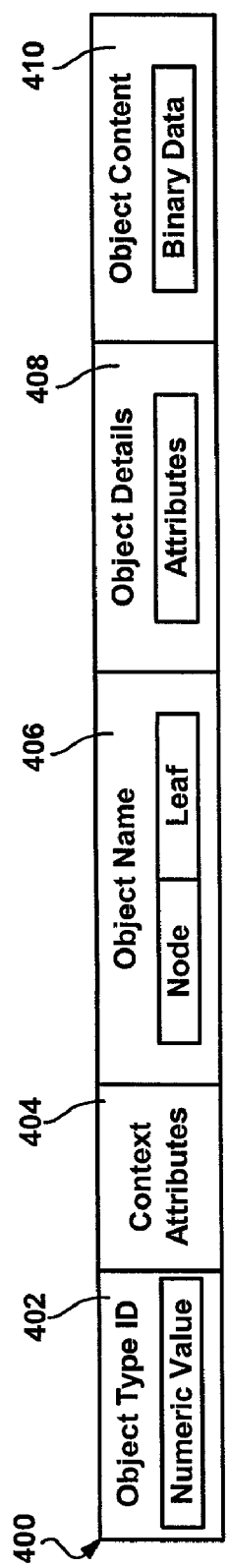
FIG. 4A is a block diagram generally representing a structure of a state object suitable for maintaining gathered data in accordance with one aspect of the present invention.

In one implementation, state data is collected as state objects, wherein as mentioned above, each state object describes a specific piece of state. As generally represented in FIG. 4A, a state object 400 includes multiple parts, or fields, including an object type identifier field 402 which is a numeric object type, assigned by the state migration engine 200, and an object name field 406, which is a string comprising a node and a leaf. The node is a hierarchical path, similar to a directory specification, and the leaf is an endpoint, similar to a file specification. The node can be empty, and the leaf is optional. Another part of the state object is an object details field 408, which in general comprises attributes associated with the state object 400, specific to the state object type. For example, file state objects have details that provide file size, dates, file system attributes, and so on. The state object details field is arranged the same for all state objects of the same type, although the field can have a variable length size. An object content field 410 is also included, which comprises any binary data that the state object 400 holds. For example, a file state object's content would be the actual bytes of data stored in the file. Note that content might be empty.

Although not necessary to the present invention, other information may be present in an object. For example, context attributes 404 (FIG. 4A) may be present to classify state as belonging to a specific user of a multiple-user configuration. Context data may also allow multiple sets of state to be grouped into one store, such as from two source computers Alternatively, or in addition to, a context field 420 (FIG. 4B) may be maintained as part of object characteristics data 412, described below with reference to FIG. 4B.

There are three basic state object types provided by the state migration engine 200, namely file state objects, registry state objects and engine state objects. File state object types are a mapping to the abstracted name space. Registry state objects are named by their key, although the root key may be encoded in the object name field 406. For example, HKEY_LOCAL_MACHINE\ may be indicated in a string format as HKLM\.

Engine state objects are used internally by the state migration engine 200 to maintain any information the engine wants to maintain. Because engine state objects appear like any other state object, the transport modules 204 save and restore the engine state objects in the same way that files or registry settings are stored. In other words, transport modules do not distinguish among state object type IDs, whereby the engine state objects (e.g., files) used to implement the state migration engine 200 are transparently saved and restored. In addition, the application layer can take advantage of this via the IsmAddControlFile( ) and IsmGetControlFile( ) APIs, so that the application can save away source-side input data for retrieval on the destination. For example, on the source platform, the application may save an input script passed in by an administrator, and perform a "virtual computer" style data gather. At the destination platform, the application may retrieve the input script and perform a source data gather (on the destination).

Additional state object types may be defined at runtime by extensible type modules 206, which may plug into the state migration engine 200 by registering entry points. Extensible type modules abstract access to the physical system, i.e., they enumerate state objects, obtain content, create state objects, save content and delete state objects. In other words, extensible type modules abstract user state into a type comprised of a node, leaf, state object attributes and data. Via extensible type modules 206, if an existing state object type cannot easily represent some given piece of state, for example, a new state object type can be created, and any kind of information can be represented in the new type.

To this end, extensible type modules 206 convert physical system settings into an abstracted state object, and vice-versa. This allows for any kind of source data to be represented uniformly in a state object. There are several benefits from this abstraction, including that the state migration engine 200 may execute generalized algorithms on these and other state objects, such as enumeration, pattern consolidation, undo, or comparison algorithms. Also, by organizing state into this uniform convention, modules can perform operations without knowing about a specific syntax of a type. For example, a script module could support a single syntax, and as new types are added, the script support will work.

An extensible type module 206 module has initialization and termination entry points. For example, at its initialization, an extensible type module 206 calls registers the type it abstracts, and provides callbacks that implement enumeration, acquire, test for existence, remove and save its state object types, along with routines to assist in transporting the state object.

Type modules may hook physical enumerations, such as for purposes of correcting inconsistencies of various (supposedly compatible) operating systems. For example, if a registry value name is misspelled on version 1 of an operating system, but was corrected on version 2 of the operating system, a type module can hook the access of the registry, so that none of the parts of the migration system will see the misspelled registry value name.

Further, note that there are situations in which one type module needs to take over physical access from another type. For example, an "accessibility" type module provides granular access to various accessibility options. These are stored in different ways in the registry, depending on the operating system, and in some cases, the state is packaged in a tight binary format (e.g., like a 32-bit bit field comprising flags indicating which options are on and which are off). In such a situation, the accessibility type module takes over part of physical access to the registry.

In general, the state migration engine 200 provides the ability to hook physical access provided by another type, and optionally allow the physical state to be modified or excluded, prohibit another type from enumerating a specific object, and add pseudo-objects to the enumeration, to emulate what should be on the system.

Figure 4B:
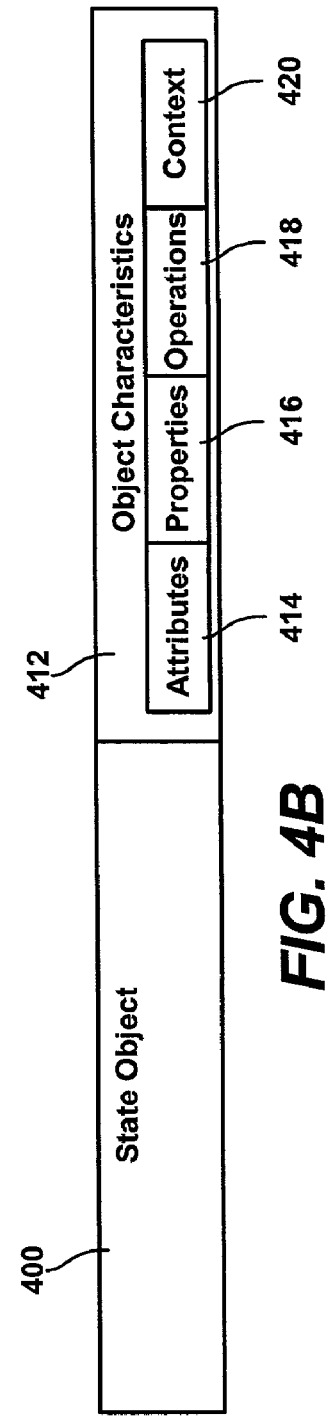
FIG. 4B is a block diagram generally representing an object and characteristic information associated therewith in accordance with one aspect of the present invention.

As represented in FIG. 4B, other information, referred to as characteristics 412, may be associated with each state object (e.g., the state object 400) to describe that state object in further detail, e.g., relative to other objects. For example, characteristics 412 can put state objects into groups, associate data with state objects, or identify state objects that need an alteration, e.g., without having to open the object and evaluate the data therein. To this end, three types of characteristics include attributes 414, properties 416 and operations 418. In general, each attribute is an arbitrary flag associated with a state object that essentially describes the state maintained therein by labeling it. An attribute can be set or removed from a state object, and a state object can have multiple attributes. A specific attribute of a state object can be locked from changes, e.g., to prevent general modules from affecting special-case modules. A state object's attributes can be enumerated, and state objects can be enumerated by the attributes they have. For example, any state object with a particular attribute set to a certain value may be distinguished from others, such as those state objects marked for applying to a destination platform.

Properties 416 comprise arbitrary data associated with state objects, and essentially describe state by associating a state object with other data. A state object can have several instances of one property type. Properties can be added or removed from a state object, and a state object can have multiple property types. A property can be pre-registered, and the registered property can be referenced in multiple state objects, or even several times in the same state object. A specific property or property instance of a state object can be locked. A state object's properties can be enumerated, and state objects can be enumerated by the properties they have. One example of using properties is for linking a state object to other state objects (e.g., by saving the other state object's ID as a property).

Operations 418 have associated code, and essentially describe state by indicating the actions that need to be taken to migrate the state. Multiple classes of operations are possible, such as those that alter the state object name or details, and those that alter the state object content. Operations can be set with per-object hints, wherein both a source hint and a destination hint can be specified. The hints might be used by the operation code to alter the behavior of the operation. Like attributes 414 and properties 416, operations 418 can be set, removed, locked, and enumerated.

State Migration—Source Modules

In accordance with an aspect of the present invention, and returning to FIG. 2, various modules are provided separately to perform the various aspects of state migration. In general, these modules (other than the state migration engine 200) are arbitrarily named to allow the modules to be ordered, and for internal use by the state migration engine 200. The name may conform to the "C" programming language character set, and may be case-insensitive.

In one implementation, each modules has a formal initialization routine and a formal termination routine that are used, instead of, for example, static linkage in DLLs. Each module also has a set of predefined entry points and/or a way to register callbacks. As described above, these module entry points are called by the state migration engine 200, and not by another module. In keeping with the present invention, each module has a specific role, as described below.

One of the modules comprises virtual computer modules 208. In general, virtual computer modules 208 are modules that gather source data to support a temporary storage location that can be edited, (e.g., on the virtual computer flow path described above with respect to step 318). A virtual computer module thus identifies state on the source machine, but does not collect additional information or determine relationships.

Thus, an application supports virtual computer mode when the temporary store is to be editable by an end-user. Virtual computer modules run on the source platform, and they identify the settings that should be moved to the temporary store. Because the temporary store can change, virtual computer modules do not perform any analysis on the source data, but rather mark state objects as persistent.

In one implementation, virtual computer modules (VCMs) may have the following entry points:

| Function | Optional? | Description |
| --- | --- | --- |
| VcmInitialize | No | Performs fast initialization, typically for global variables or other module-specific reasons |
| VcmParse | Yes | Reads input scripts and prepares the state migration engine environment. Used to allow the application layer a chance to alter the input scripts at runtime. |
| VcmQueueEnumeration | No | Called by the state migration engine when main execution begins. The VCM module queues its callbacks, supplying a state object pattern for each callback. |
| VcmQueueHighPriorityEnumeration | Yes | Called by the state migration engine when main execution begins. The VCM module queues its high priority callbacks. This is used for special cases, when a pattern must be queued based on a runtime decision. |
| VcmTerminate | Yes | Called when the module is no longer needed |

Virtual computer modules register callbacks in the VcmQueueEnumeration or VcmQueueHighPriorityEnumeration functions by calling an IsmQueueEnumeration function of the state migration engine 200, specifying a state object pattern and callback function, (wherein as mentioned above, functions included in the state migration engine 200 begin with the prefix "Ism" and are generally represented in APPENDIX A). Later, the state migration engine 200 enumerates the physical system, such as one state object at a time. A state object is tested against the queued pattern, and if a match occurs, the callback is called. For example, a virtual computer module may register a callback for all state objects (by specifying * or other suitable wildcards), or the callback might register a callback for a specific state object (by specifying the specific state object name).

Inside a virtual computer module callback, state objects are tested to determine if they should be migrated. State objects that should be transferred to the destination are marked as "persistent" by calling IsmMakePersistentObject. Virtual computer modules can also hook callbacks into other enumerations by calling IsmHookEnumeration, which allows a module callback to be called when the specified pattern matches a state object, and at least one callback is queued for the state object, either by the same module or by another module.

As also shown in FIG. 2, a source data gather module 209 is a module that identifies state on the source machine. One or more source data gather modules 209 run on the source platform when the application supports opaque temporary stores (i.e., stores that are not altered by end-users, as described above with respect to the standard flow path of step 314). This type of module also collects characteristics of the state, and often determines if the state should be migrated. In other words, source data gather modules 209 comprise modules that gather the source state data, and may organize the state data and/or mark it for translation.

Thus, a source data gather module 209 is responsible for identifying state objects that need to be transferred to the destination, identifying state objects that need to be applied on the destination, and examining state objects and marking them with characteristics. Note that a destination data gather module 212 is similar to a source data gather module except that it is run on the destination platform when the application 202 supports editable temporary stores (i.e., via the virtual computer flow path).

Source data gather modules 209 queue enumerations for state objects that are candidates for transfer to the destination. Queuing may be based on a script, or it may be hard-coded, depending on the purpose of the module. Queuing associates a pattern with a callback function which gets called when state objects are found that match the queued pattern.

State objects are examined inside a source data gather module callback. In the examination, state objects that should be transferred to the destination are marked as "persistent" (e.g., by calling an IsmMakePersistentObject method). State objects that should be applied on the destination are marked as such, (e.g., by calling an IsmMakeApplyObject function).

Source data gather modules (SGMs) have the following entry points in the described implementation:

| Function | Optional? | Description |
| --- | --- | --- |
| SgmInitialize | No | Performs fast initialization, typically for global variables or other module-specific reasons |
| SgmParse | Yes | Reads input scripts and prepares the state migration engine environment. Used to allow the application layer a chance to alter the input scripts at runtime. |
| SgmQueueEnumeration | No | Called by the state migration engine when main execution begins. The SGM module queues its callbacks, supplying a state object pattern for each callback. |
| SgmQueueHighPriorityEnumeration | Yes | Called by the ISM when main execution begins. The SGM module queues its high priority callbacks. This is used for special cases, when a pattern is to be queued based on a runtime decision. |
| SgmTerminate | Yes | Called when the module is no longer needed |

Source data gather modules register callbacks in the SgmQueueEnumeration or SgmQueueHighPriorityEnumeration functions by calling IsmQueueEnumeration, specifying a state object pattern and callback function. Later, the engine enumerates the physical system (or virtual computer), one state object at a time. A state object is tested against the queued pattern, and if a match occurs, the callback is called.

Source data gather modules can also hook callbacks into other enumerations by calling IsmHookEnumeration. This allows a module callback to be called when the specified pattern matches a state object, and at least one callback is queued for the state object, either by the same module or by another module. Note that a source data gather module may be used as a virtual computer module.

After the entire system is enumerated and the source data gather modules 209 have been processed, the state migration engine 200 calls special analysis entry points. These entry points are provided by one or more source analyze modules 210, each of which is a module that examines two or more pieces of data to produce additional understanding of the state, such as to refine the data organization or translation. Special cases are often handled in a source analyze module 210.

One purpose of a source analyze module 210 is to execute algorithms on state objects and characteristics established by source data gather modules 209. A source analyze module 210 is normally used when two or more source data gather modules 209 contribute to the knowledge of a state object. For example, a source analyze module 210 might identify compatibility, or it might implement logical groups.

A source analyze module (SAM) has the following entry points:

| Function | Optional? | Description |
| --- | --- | --- |
| SamInitialize | No | Performs fast initialization, typically for global variables or other module-specific reasons |

-continued

| Function | Optional? | Description |
|---|---|---|
| SamEstimateProgressBar | Yes | This entry point allows the SAM to compute a progress bar segment. It is included to separate relatively fast progress bar estimation from relatively slow analysis. The user interface typically provides an animation while this function runs. |
| SamExecute | No | Called by the state migration engine after all SGMs are completely processed. This function is responsible for calling the state migration engine progress bar routines regularly, to keep the application responsive. |
| SamTerminate | Yes | Called when the module is no longer needed |

SamExecute gains control of the migration engine 200 until it returns, so it needs to keep the progress bar accurately updated. SamExecute initiates its own enumerations. Typically state objects are enumerated by the characteristics they have (e.g., by calling IsmEnumFirstObjectWithAttribute). Notwithstanding, source analyze modules are free to do any processing they want, in any order they want.

State Migration—Transport and Transport Modules

Data gathering completes after the source data gather modules 209 and source analyze module 210 are processed in standard mode, or after the virtual computer modules 208 are processed in virtual computer mode. After data gathering completes, the application program 202 regains control, whereby the application program 202 initiates the saving of the data via the selected transport. Before saving, the application program 202 has an opportunity to display more information to the user, such as help information relative to the selected transport 204. The application program 202 can adjust the transport selection, and/or use statistics on what was gathered to make additional decisions.

To save the gathered state, the application calls an IsmSave function or the like in the state migration engine 200, which in turn calls out to the selected transport module 204 to serialize the state to the temporary store previously identified, as described above. More particularly, to save state in one implementation, when the application 202 calls the IsmSave function, the state migration engine 200 calls the selected transport module's TransportSave entry point. The transport module then calls one or more state migration engine routines (such as IsmEnumFirstPersistentObject) to enumerate state objects that need to be saved to the temporary store. The transport does not necessarily know about specific state object types, but preferably transfers the state object data in a generalized way, saving the state object name, content and details in a suitable format.

Because the saving process may be time-consuming, depending on the amount of data to save and the transport module selected, an application progress callback is typically called on a regular basis. A transport module 204 may send additional data, such as via the application's message callback.

Transports can support slow or unreliable temporary stores, and the state migration engine offers the ability to restart an interrupted download (and/or upload when loading state). Entry points are provided allow a transport module to resynchronize, (e.g., TransportResumeSaveState on saving and TransportResumeApply on loading). Restarting is optional, and is transport-specific.

Any special needs of transports may be handled through the application message callback. For example, a floppy disk transport may prompt the user for floppy disks, which it does through the application message callback, because the user interface is owned by the application layer. Other uses of the message callback include providing information about transport size or current amount of data transferred.

Once the save API returns, the save process is done. The application calls a termination entry point to shut down the engine.

The following is a list of entry points included in a transport module (TRM):

| Function | Optional? | Description |
|---|---|---|
| TransportInitialize | No | Performs initialization, typically for global variables or other module-specific reasons |
| TransportEstimateProgressBar | Yes | This entry point allows the TRM to compute a progress bar segment. It is included to separate relatively fast progress bar estimation from relatively slow analysis. |
| TransportQueryCapabilities | No | Called by the state migration engine whenever the transport capabilities are needed. The transport provides flags indicating the capabilities it supports, along with a friendly description for display in a dynamic user interface. |
| TransportSetStorage | No | Called by the state migration engine to set the temporary store location. The transport validates the store location and checks for an existing image. |
| TransportSaveState | No | Enumerates persistent state objects and writes them to the temporary store. |
| TransportResumeSaveState | Yes | Restarts the write of persistent state objects, which may have been interrupted by a power outage or other failure. |
| TransportBeginApply | No | Called by the state migration engine when the source data should be downloaded to the local machine. It is the transport's responsibility to keep the progress bar updated. |
| TransportResumeApply | Yes | Called by the state migration engine when the source data download was interrupted. The transport can then restart the download, picking up at the point of interruption. |
| TransportAcquireObject | No | Called by the state migration engine whenever a source state object is needed. The transport supplies the state object and keeps the resources open until TransportReleaseObject is called. |
| TransportReleaseObject | No | Called by the state migration engine when an acquired state object is no longer needed. The ISM typically makes a copy of the state object, to minimize the time between acquire and release. |

-continued

| Function | Optional? | Description |
|---|---|---|
| TransportEndApply | No | Called after acquire requests are complete. Normally, this entry point cleans up any temporary files left from the download. |
| TransportTerminate | Yes | Called when the module is no longer needed |

State Migration—Destination

On the destination platform, in general, the source data is obtained from the transport, and applied to the destination. To this end, the application 200 is executed on the destination platform, determines that it is running on the destination, and starts the state migration engine 200, as generally represented in the flow diagram of FIG. 5 via steps 500, 502 and 504. At step 506, to load the source data, the application 202 calls an API or the like of the state migration engine 200, which in turn calls the transport module 204 to download the source data from the temporary store. Note that any information needed from the user (e.g., which transport to use) may be obtained. During the download process (which might be lengthy), application callbacks normally will be called to provide progress information to the user, (e.g., via a progress bar callback and a message callback). Once this downloading process completes, the source data is available to the destination computer.

Figure 5:
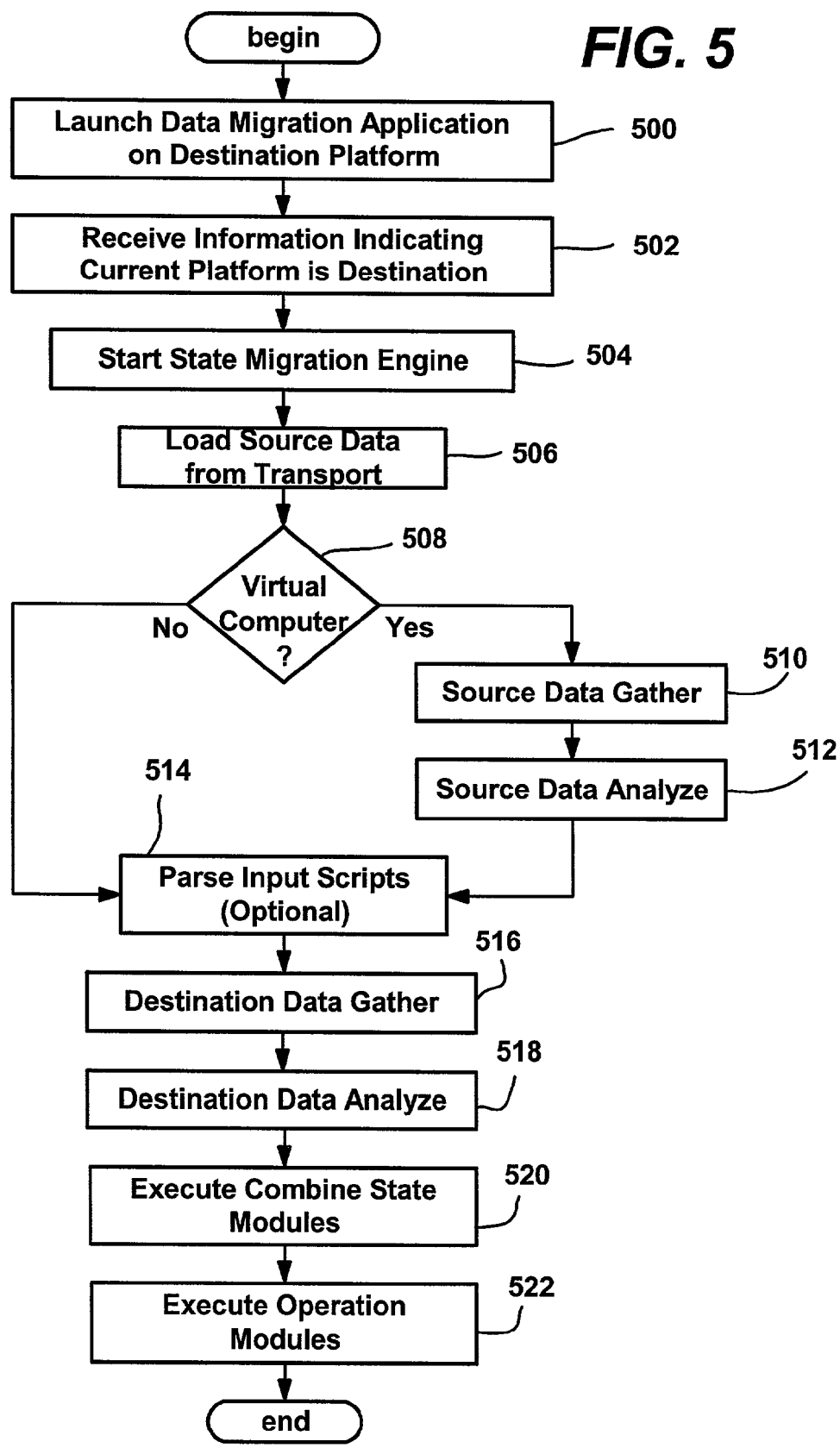
FIG. 5 is a flow diagram generally representing actions taken on a destination platform to apply data to the destination platform in accordance with one aspect of the present invention.

If the application was designed for the virtual computer flow path (step 318 of FIG. 3 above), then the destination performs source data gathering and analysis, as represented in FIG. 5 via steps 508, 510, and 512. In one implementation, this is done by calling the state migration engine's execute API. The state migration engine 200 takes care of calling destination-side "source" data gather modules and analyze modules as represented by steps 510 and 512 (e.g., similar to the source data gather modules 209 but running on the destination platform as if they were on the source platform) at the right times with the appropriate data. Note that similar to the source platform, the application 200 has an opportunity to have the source gather modules pre-parse their scripts, allowing the user interface to modify the scripts prior to gathering and analyzing virtual computer-gathered data.

Because this is on the destination platform, the application 202 also performs additional data gathering and analysis on the destination computer, via destination data gather modules 212 and destination data analyze modules 213, typically for purposes of merging. Again, the state migration engine 200 coordinates the operations, calling these modules 212 and 213 via the calls described below. This is generally represented in FIG. 5 via steps 516 and 518, (after any optional parsing of input scripts at step 514).

After destination data is gathered and analyzed, entry points for operation combining are called by the state migration engine 200. These entry points allow combine state modules 214 to execute merging algorithms, which may be complex, before the destination computer is altered, as generally represented in FIG. 5 via step 520. The state migration engine completes the migration by applying the source data to the destination, by calling operation modules 215 with the appropriate data.

Destination Modules

The destination gather modules 212 are modules that identify and gather state on the destination platform, e.g., the target machine, for purposes of merging or handling collisions. A destination data gather module 212 may be identical to a source gather module, except that it accesses the destination platform instead of the source platform. In the case that the application supports editable temporary stores (the virtual computer flow path), both source data gather modules and destination data gather modules 212 run on the same platform, but source data gather modules access the virtual computer, while destination data gather modules 212 access the physical computer.

Destination data gather modules 212 queue enumerations for state objects that are candidates for merging or collisions. Queuing may be based on a script, or may be hard-coded, depending on the purpose of the module. Queuing associates a pattern with a callback function, and the callback function gets called when state objects are found matching the queued pattern.

Inside a destination data gather modules callback, state objects are examined. State objects that should be altered, merged, and so forth to allow the source data to work properly are marked with various characteristics, such as a move operation. Source state objects with colliding names may also be altered (e.g., by removing the "apply" attribute by calling the state migration engine's IsmClearApplyOnObject function).

Destination data gather modules (DGMs) have the following entry points:

| Function | Optional? | Description |
|---|---|---|
| DgmInitialize | No | Performs fast initialization, typically for global variables or other module-specific reasons |
| DgmQueueEnumeration | No | Called by the ISM when main apply execution begins. The DGM module queues all of its callbacks, supplying a state object pattern for each callback. |
| DgmQueueHighPriorityEnumeration | Yes | Called by the state migration engine when main apply execution begins. The DGM module queues all of its high priority callbacks. This is used for special cases, when a pattern must be queued based on a runtime decision. |
| DgmTerminate | Yes | Called when the module is no longer needed |

Destination data gather module 212 modules register callbacks in the DgmQueueEnumeration or DgmQueueHighPriorityEnumeration functions by calling IsmQueueEnumeration, specifying a state object pattern and callback function. Sometime later, the engine enumerates the physical destination system, one state object at a time. A state object is tested against the queued pattern, and if a match occurs, the callback is called. Destination data gather modules 212 can also hook callbacks into other enumerations by calling IsmHookEnumeration. This allows a module callback to be called when the specified pattern matches a state object, and at least one callback is queued for the state object, either by the same module or by another module. Destination data gather modules 212 can compare destination state objects against source state objects by specifically acquiring the source state object. On the destination side, both platforms are available for reading.

After the entire destination system is enumerated and the destination data gather modules 212 have been processed, the state migration engine 200 calls special analysis entry points. These entry points are provided by destination analyze modules 213. Like a source analyze module 210, a destination analyze module 213 is a module that examines two or more pieces of data to produce additional understanding of the state. A destination analyze module 213 differs from a source analyze module 210 in that it analyzes destination state instead of source state.

The purpose of a destination analyze module 213 is to execute algorithms on state objects and characteristics established by destination data gather module 212. Normally a destination analyze module 213 is used when two or more destination data gather modules 212 contribute to the knowledge of a state object. For example, a destination analyze module 213 may identify compatibility, or may implement logical groups.

A destination analyze module (DAM) has the following entry points:

| Function | Optional? | Description |
| --- | --- | --- |
| DamInitialize | No | Performs fast initialization, typically for global variables or other module-specific reasons. |
| DamEstimateProgressBar | Yes | This entry point allows the DAM to compute a progress bar segment. It is included to separate relatively fast progress bar estimation from relatively slow analysis. |
| DamExecute | No | Called by the state migration engine after all DGMs are processed. This function is responsible for calling the state migration engine progress bar routines to keep the application responsive. |
| DamTerminate | Yes | Called when the module is no longer needed |

DamExecute initiates its own enumerations. Typically state objects are enumerated by the characteristics they have (e.g., by calling IsmEnumFirstObjectWithAttribute). Note, however, that destination analyze modules are free to do any processing they want, in any order they want.

On the destination platform, after destination data gather modules 212 and destination analyze modules 213 have been run, a special module is given a chance to reconcile any problems with the source and destination data. This module is called a combine state module 214.

A combine state module 214 is a module that examines source and destination state for purposes of merging. A combine state module 214 sets or removes operations as necessary to preserve destination state. Combine state modules 214 implement algorithms that have knowledge of both the source and destination sides.

Combine state modules 214 are very similar to source analyze modules 210 and destination analyze modules 213, except that they are intended to be used for algorithms that work with the understanding of both the source and destination platforms. That is, before combine state modules 214 run, the source platform has been processed, and the destination platform has been queried and analyzed.

A combine state module (CSM) has the following entry points:

| Function | Optional? | Description |
| --- | --- | --- |
| CsmInitialize | No | Performs fast initialization, typically for global variables or other module-specific reasons |
| CsmEstimateProgressBar | Yes | This entry point allows the CSM to compute a progress bar segment. It is included to separate relatively fast progress bar estimation from relatively slow analysis. |
| CsmExecute | No | Called by the state migration engine after SGMs, SAMs, DGMs and DAMs are processed. This function is responsible for calling the state migration engine progress bar routines, to keep the application responsive. |
| CsmTerminate | Yes | Called when the module is no longer needed |

CsmExecute initiates its own enumerations, however combine state modules 214 are free to do any processing they want, in any order they want.

After the data has been collected, and the ha characteristics have been finalized, settings are applied to the destination platform. No changes should remain at this point, and the state migration engine 200 should know what state objects to apply, and any transformations that need to be applied to those state objects. With this information, the state migration engine 200 can correctly enumerate the state objects marked for apply, perform operations on those state objects, and write them to the destination.

Transformations to state objects are done in operation modules 215. More particularly, operation modules 215 are modules that implement operations such as state object translation, apply, content editing and/or state object renaming/deletion code.

In one implementation, the state migration engine 200 applies one state object at a time, and state objects can be marked for one or more operations. Operation modules 215 register callbacks for those operations, and the callbacks alter the state object. Alterations occur in memory (or in a temporary file) before the final result is written to the system.

Operation modules 215 include two entry points, OpmInitialize and OpmTerminate, which work like other initialize and terminate routines in the other modules. In OpmInitialize, the operation module 215 registers callbacks for operations. Two types of operations are included, namely changes to the state object name or details, and changes to the state object content.

A first type of operation is referred to as "filtering," which is directed to state object renaming, deleting, or detail adjustment. Filtering is independent of the state object's content. Filter callbacks are registered by calling IsmRegisterOperationFilterCallback.

A second type is called "content editing," and is independent of the state object's name. In content editing, the callback function examines a state object and performs content migration, such as fixing the source paths to point to proper corresponding destination locations. Content editing callbacks may be registered by calling IsmRegisterOperationApplyCallback. Operation modules 215 may register high priority filters and content editing callbacks by passing an argument setting with the IsmRegisterOperationFilterCallback or IsmRegisterOperationApplyCallback.

In the implementation described herein, applying is staged in three passes, including a high priority destination apply, wherein destination state objects that have a high priority operation are processed. High priority destination operations are normally used to clean up conflicting destination settings. The second pass is a source apply pass, wherein the state migration engine 200 processes the source state objects marked for apply or marked with an operation. The third pass is a normal priority destination apply, wherein the state migration engine 200 processes the destination state objects marked for apply or marked with an operation.

State Migration—Operating Example

Figure 6:
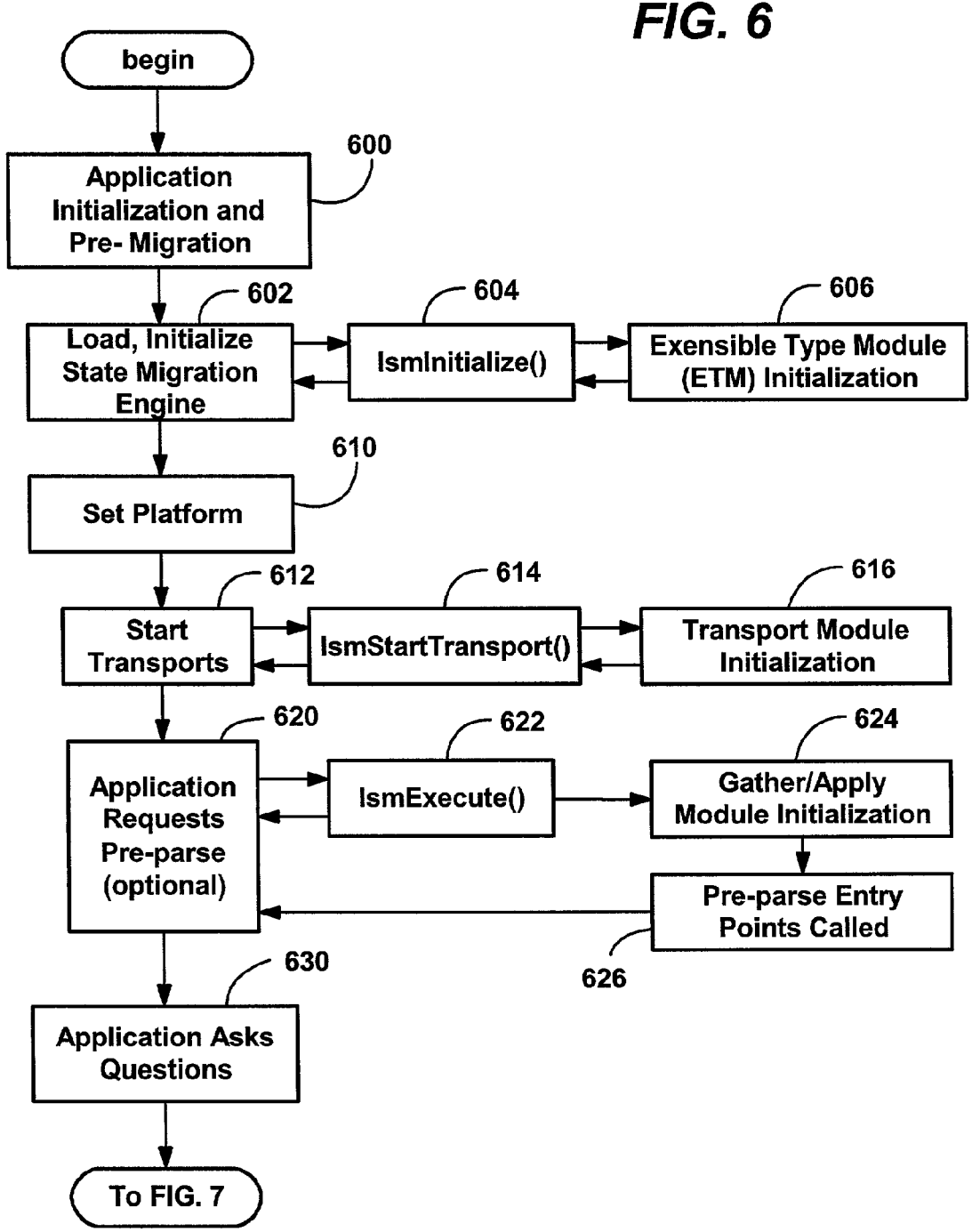

Turning to an explanation of the operation of the present invention with respect to the flow diagram of FIGS. 6 and 7, FIGS. 6 and 7 generally show the calls made by the application program 202 to the state migration engine 200 and resulting actions. Note that the various operations described in FIGS. 6 and 7 may take place on both the source or destination platforms, except where otherwise noted. As represented in FIG. 6, when the application 202 is started, (e.g., such as in a typical manner by clicking an icon, typing a command prompt or run instruction), the application 202 can perform any initialization and/or pre-migration processes it desires, as generally represented at step 600. The application 202 then starts the state migration engine (or ISM, intermediate state manager) 200, such as by loading a DLL, and initializes it, for example, via an IsmInitialize call (step 604). In turn the state migration engine 200 initializes any extensible type modules at step 606, generally to prepare for any non-standard state objects.

Steps 612, 614 and 616 represent the state migration engine 200 starting and initializing the available transports, via a call to IsmStartTransport( ). In this manner, the state migration engine 200 will be able to quickly determine whether an application's transport selection (step 700, described below) and any information related thereto is valid.

Step 620 represents the optional pre-parsing of scripts, via an IsmExecute( ) call (step 622) to the state migration engine 200. As described above, the application program 202 can have the source or destination modules pre-parse their input scripts, allowing the user to customize the scripts at runtime. Step 624 represents the initializing of the data gather and analyze modules (source platform) or the data apply and analyze modules (destination platform), and step 626 represents the calling of any pre-parse entry points on these modules if the pre-parsing option is in effect.

Step 630 represents the application asking any questions of the user. For example, when gathering data from a source platform, the application may obtain the virtual computer or standard path, i.e., the virtual path will be chosen whether state data editing will be performed. Any other information needed from the user or from a module may be obtained at this time.

Steps 700, 702 and 704 of FIG. 7 represent the selection and execution of a valid transport. Note that this occurs on the source platform or the destination platform. Further, note that it is feasible to pass at least some of the transport information to the destination application instance with little or no user selection. For example, if a transport writes the source state data to a floppy, any transport settings and the like can be placed in a known file on that floppy, whereby the destination application instance can search for the known file or obtain those settings simply by the user selecting "floppy" as the location of the source state.

Steps 708, 710 and 712 are executed on the destination only, as step 706 essentially bypasses these steps for source platforms. More particularly, steps 710 and 712 represent the IsmLoad( ) call or calls to the transport module 204 to load the objects.

Steps 714, 716 and 718 represent the calling of the IsmExecute( ) function of the state migration engine 200 to perform the various migration operations described above. Note that step 718 need not be executed if the modules were initialized for pre-parsing operations, as described above.

For purposes of description of steps 718, 720 and 722, an example of how state is collected and applied will be described with respect to a registry setting as the state object, however as is understood, the present invention can gather virtually any source platform data and apply it to virtually any destination platform. Indeed, although a registry example will be described, the present invention can operate to migrate state from a source platform that does not use a system registry to a source platform that does, or vice-versa.

To collect the registry setting, such as a setting used by an e-mail application program, a data gather module and data analyze module may be written that accesses the registry at the particular key, (and possibly others), and analyzes it as desired. For example, a registry setting, if set to a particular value or string, may indicate that an associated file contains information that changes the e-mail program's default settings. The data gather module can obtain the registry setting and the file, (possibly along with other registry settings and files), and other data gather modules can be called to gather other source state, such as for other application programs.

Once at least the e-mail program's registry setting and associated file are gathered, a data analyze module can determine based on the registry setting whether the associated file also needs to be migrated, or whether the default file on the destination machine will suffice (and thus the associated source file can be marked so as to not use it). When such analysis is complete, an appropriate registry object, and optionally the file object, will be constructed for temporarily storing via the transport. Note that in the virtual computer mode, the registry setting and file will be gathered and preserved, but not yet analyzed, because the user could later edit the registry setting to change whether the file was needed, whereby the earlier analysis could be incorrect and the discarded file now needed.

Once temporarily stored, the destination application causes the source data to be recovered from the temporary storage, as generally described above with respect to steps 708, 710 and 712. In the e-mail program registry setting example, the destination data gather module can gather its own corresponding e-mail registry setting and associated file. At this time, a combine state module can resolve any conflicts according to a set of rules for each object or for several objects. For example, when merging the state data of two registry objects, a rule such as "non-NULL source settings override destination settings" essentially may be used by a combine state module. For other objects, such as those that describe platform specific settings, the combine state module can leave the destination settings intact by marking the source object so as to not be applied. Note that the source state information is generically abstracted from the physical system essentially without knowledge of the destination platform, whereby any destination platform modules can interpret the source objects and do with each of them whatever it wants.

At step 722, on the destination platform, operation modules 215 apply the objects that are marked for applying, essentially writing the abstracted settings and files as appropriate to the destination platform's physical system. As part of the data applying process, a source setting in the object can be translated as needed for the destination platform. Again, because the state information is generically abstracted and maintained, translation can be different depending on the destination platform, but the source gather and analyze modules need not be concerned with the destination platform's requirements, and vice-versa.

Note that the various types of modules described herein are generally executed sequentially, e.g., the operation modules are executed following the combine state modules, however at least some of the module types can be arranged to operate in parallel by grouping the modules together, e.g., start an operation module when its corresponding combine module (or modules) is complete, even though combine modules for other objects have not yet completed. By way of example, the modules that apply state for an e-mail application program can operate on one thread, while the modules that apply state for a spreadsheet application program can operate on another thread. In general, modules may be prioritized and ordered, specific functions within the modules may be prioritized and ordered, and certain operation combinations may be prohibited.

When the operation modules complete, the engine is terminated via an IsmTerminate( ) call at step 726, which shuts down the other modules at step 728. At this time, the destination platform has source data migrated thereto, translated and merged as appropriate for the destination.

As can be readily appreciated, the state migration technology of the present invention can be used as a mechanism for preparing an offline upgrade image. In other words, for use in preparing a new operating system "B" by running setup on an existing operating system "A". For example, original equipment manufacturers (OEMs) can use state migration of the present invention to upgrade an existing user's system over the Internet, and put the upgraded image on the machine at install time. Because of the state abstraction provided by the present invention, this may be accomplished by pre-configuring a hard disk with the operating system and with user state, before the computer is even manufactured. When the computer is later manufactured, the pre-configured hard disk is simply placed in the new machine, whereby on the initial power on, only machine-specific configuration would be required.

As can be seen from the foregoing detailed description, there is provided a system and method with a highly flexible architecture capable of supporting virtually any environment change including operating system changes, whether to a different operating system version or a different operating system, and machine-to-machine environment migration, including one machine to many machines. Comparison of state information is also possible, e.g., to compare a reference image to the current system, as is version translation and conversion. Because the state is maintained in abstracted state objects, interruption scenarios are handled, such as to restart long processes that are interrupted by unexpected failure, and restore a system that had an incomplete apply.

To accomplish the present invention, state abstraction abstracts the physical system in a uniform way, providing a consistent way to work with any kind of data, such that powerful analysis and transformations can be accomplished without altering the actual computer. Because source data and destination data are in separate namespaces, the two can be compared and merged without actually altering the actual computer. Abstraction of the system also provides extensibility, in that virtually any physical system state can be represented in the abstraction, including state developed in the future, whereby the present invention will operate without modification to the migration engine. Modularity provides the ability to isolate different tasks among different groups and different code bases.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A system for migrating state data from a source platform to a destination platform, comprising, on the source platform:
   1) a migration application program operable to be executed on the source platform and on the destination platform, where the migration application program is capable of determining whether it is executing on the source platform or the destination platform;
   2) a source state migration engine separate from and invoked by the migration application program;
   3) a gather module called by a migration application program via the source state migration engine to gather source state data from the source platform; and
   4) at least one transport module called to write the source state data to a temporary storage selected by the migration application program via the source state migration engine, such that the source state data is stored in an abstracted form independent of the source platform and independent of the destination platform, the at least one transport module being selected by the migration application program via the source state migration engine based on a capability of the at least one transport module; and on the destination platform
   1) the migration application program;
   2) a destination state migration engine invoked by the migration application program based on a determination by the migration application that the migration application is executing on the destination platform;
   3) a transport module called to read the source state data from the storage; and
   4) an operation module called to apply the source state data to at least one storage location accessible to the destination platform.

2. The system of claim 1 wherein at the source platform, the gather module and the transport module are called by the source state migration engine.

3. The system of claim 2 wherein the gather module is called by the source state migration engine in response to a call from the migration application program.

4. The system of claim 2 wherein the transport module is selected and called by the source state migration engine in response to at least one call from the migration application program.

5. The system of claim 1 wherein at the destination platform, the transport module and the operation module are called by the destination state migration engine.

6. The system of claim 1 wherein the source state migration engine includes a set of at least one interface via which the gather module and the transport module exchange information with the source state migration engine module.

7. The system of claim 1 wherein at the source platform, the gather module comprises a source state data gather module.

8. The system of claim 7 further comprising, at the source platform, a source analyze module that analyzes state data gathered by the source state data gather module.

9. The system of claim 1 wherein at the source platform, the gather module collects information from a registry.

10. The system of claim 1 wherein at the source platform, the gather module collects at least one file.

11. The system of claim 1 wherein the state data is gathered into a state object set comprising at least one state object.

12. The system of claim 11 wherein the gather module collects information from registry information and file information, and wherein the state object set includes at least one registry state object for maintaining the registry information and least one file state object for maintaining the file information.

13. The system of claim 11 wherein the state object set includes at least one engine state object.

14. The system of claim 13 wherein the state object set includes another type of state object, and further comprising, at the source platform, an extensible type module that is called by the source state migration engine to abstract information into the other type of state object.

15. The system of claim 14 further comprising, at the destination platform, an extensible type module that is called by the destination state migration engine to recover the information abstracted at the source platform.

16. The system of claim 1 wherein at the source platform, the gather module comprises a virtual computer gather module that gathers state data into a virtual computer format that is capable of being edited.

17. The system of claim 16 further comprising, at the destination platform, a source state data gather module that gathers state data from the virtual computer format.

18. The system of claim 17 further comprising, at the destination platform, an analyze module that analyzes state data gathered by the source state data gather module of the destination platform.

19. The system of claim 1 further comprising, at the destination platform, a destination state data gather module that gathers destination state data corresponding to the destination platform.

20. The system of claim 19 further comprising, at the destination platform, an analyze module that analyzes the destination state data gathered by the destination state data gather module.

21. The system of claim 19 further comprising, at the destination platform, a combine state module that merges the source state data and the destination state data.

22. The system of claim 1 wherein the operation module changes at least some of the source state data when called to apply the source state data.

23. A computer-implemented method, comprising,
gathering at least one set of state data from a source platform;
identifying associated state data from the source platform, the associated state data containing information that changes a setting of at least one state data in the set of state data gathered from the source platform;
determining an associated state data from the identified associated state data to be migrated from the source platform based on a setting associated with the identified associated state data;
abstracting the associated state data from the determining step into a format that is independent of the source platform and independent of any destination platform;
transporting the abstracted state data into a storage accessible by a destination platform;
recovering the state data from the storage at the destination platform; and
applying at least some of the recovered state data at the destination platform such that the destination platform has available thereto at least some of the state data from the source platform in a format that is suitable for the destination platform.

24. The method of claim 23 wherein abstracting the state data comprises writing the state data into a state object.

25. The method of claim 23, wherein one of the migratable objects comprises a registry entry in a registry on the source platform, and a value stored in the registry entry is analyzed to determine if it indicates a dependency on another migratable object.

26. The method of claim 23 further comprising, selecting a transport from among a plurality of transports capable of transporting the state data into the storage.

27. The method of claim 23 further comprising, gathering destination state data at the destination, and merging at least some of the destination state data with the state data recovered from the storage.

28. The method of claim 23 further comprising, translating at least some of the state data recovered from the storage to correspond to the destination platform.

29. The method of claim 23 wherein at least some of the state data contains a file, and wherein applying at least some of the state data at the destination platform includes creating a file corresponding thereto accessible to the destination platform.

30. The method of claim 23 wherein at least some of the state data contains a setting, and wherein applying at least some of the state data at the destination platform includes recreating the setting at a location accessible to the destination platform.

31. The method of claim 30 wherein recreating the setting comprises writing information to a registry.

32. The method of claim 23 further comprising communicating with an extensible type module to access at least some of the state data.

33. A system for collecting state data from a source platform for use in configuring a destination platform, comprising:
a state migration engine;
a gather module that gathers source state data from the source platform in response to a call from the state migration engine, where the gather module further identifies associated state data from the source platform, the associated state data containing information that changes a setting of at least one gathered state data and determines an associated state data from the identified associated state data to be migrated from the source platform, and where the gather module is caused to be invoked by a migration application program configured to be capable of executing on the destination platform to manage migrating the source state data to the destination platform; and a transport module that writes the source state data gathered by the gather module to a storage, the transport module operating in response to a call from the state migration engine, the source data written in an abstracted format independent of the source platform and independent of any destination platform.

34. The system of claim 33 wherein the gather module is called by the state migration engine in response to a call from the migration application program.

35. The system of claim 33 wherein the transport module is a selectable component, and wherein the transport module selected and called by the state migration engine in response to at least one call from the migration application program.

36. The system of claim 33 wherein the gather module includes a source state data gather module.

37. The system of claim 36 further comprising a source analyze module that analyzes state data gathered by the source state data gather module.

38. The system of claim 33 wherein the gather module collects information from a registry.

39. The system of claim 33 wherein the gather module collects at least one file.

40. The system of claim 33 wherein the data is gathered into a state object set comprising at least one state object.

41. The system of claim 40 wherein the state object set includes at least one registry state object that maintains registry information and at least one file state object that maintains file information.

42. The system of claim 40 wherein the state object set includes at least one engine state object.

43. The system of claim 40 wherein the state object set includes another type of state object, and further comprising an extensible type module that is called by the state migration engine to abstract information into the other type of state object.

44. The system of claim 33 further comprising at least one mechanism configured to read the state data from the storage and apply the state data to the destination platform.

45. A system for configuring a destination platform with state data collected from a source platform, comprising:
  a migration application configured to be capable of performing migration on the source platform and on the destination platform;
  a state migration engine separate from and invoked by the migration application;
  at least one transport module, selected by the migration application via the state migration engine, that reads source state data from a storage in response to a call from the state migration engine, the source state data stored in an abstracted format independent of the source platform and independent of any destination platform; and
  an operation module that applies the source state data to at least one storage location accessible to the destination platform by performing at least one of filtering or content editing, the transport module operating in response to a call from the state migration engine.

46. The system of claim 45 wherein the source state data comprises virtual computer data gathered into a virtual computer format that is capable of being edited, and further comprising, a state data gather module that gathers state data from the virtual computer format.

47. The system of claim 46 further comprising, an analyze module that analyzes the state data gathered by the state data gather module.

48. The system of claim 45 further comprising, a destination state data gather module that gathers destination state data corresponding to the destination platform.

49. The system of claim 48 further comprising, an analyze module that analyzes the destination state data gathered by the destination state data gather module.

50. The system of claim 48 further comprising, a combine state module that merges the source state data and the destination state data.

51. The system of claim 45 wherein the operation module changes at least some of the source state data when called to apply the source state data.

52. The system of claim 45 further comprising at least one mechanism configured to gather the source state data from the source platform and store the source state data in the storage.

53. A computer program product, comprising, a computer-readable storage medium having executable code thereon comprising:
  a first computer instruction for reading at least one set of state data and at least one set of associated state data from a source platform, wherein the at least one set of associated state data changes a setting of at least one state data in the at least one set of state data and identifying the at least one set of associated state data to be migrated from the source platform;
  a second computer instruction for abstracting the state data into a predetermined format to obtain abstracted state data that is independent of the source platform and independent of any destination platform, any destination program operating in an environment incompatible with the environment in which the source platform is operating; and
  a third computer instruction for writing the abstracted state data to a storage medium.

54. A computer program product, comprising, a computer-readable storage medium having executable code thereon comprising:
  a first computer instruction for directing a gather module via a source state migration engine to read abstracted state data representative of a state of a source platform wherein a format of said abstracted state data is platform independent, where a migration application program determines whether it is running on the source platform or on a target platform, and where the first computer instruction is invoked by the migration application program in response to the migration application program's determination that it is running on the target platform, the source state migration engine being separate from and invoked by the migration application program; and
  a second computer instruction for applying at least some of the abstracted state data at a target platform such that the target platform has available thereto at least some of the state data from the source platform in a format that is suitable for the second platform.

* * * * *